UNITED STATES PATENT OFFICE.

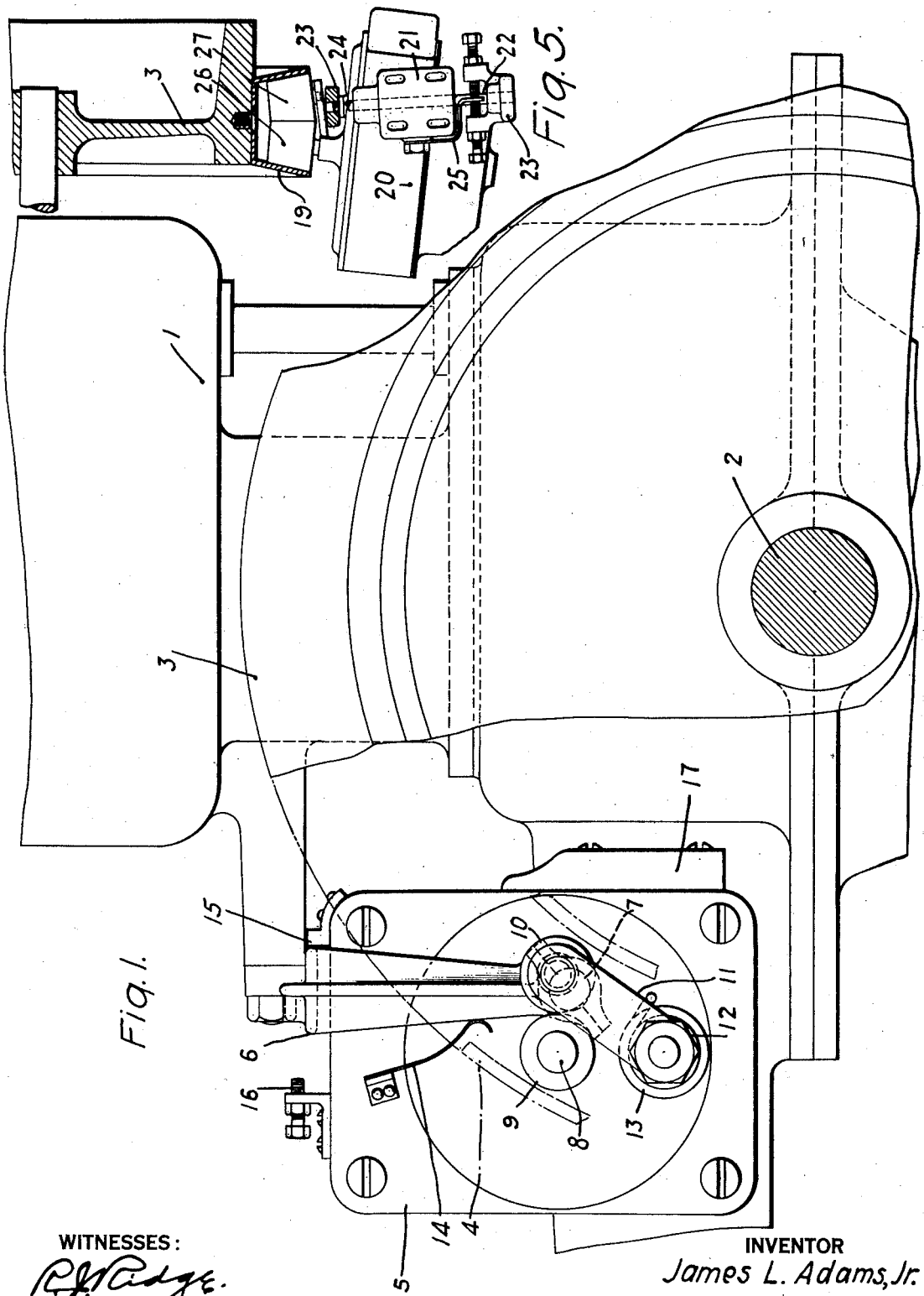

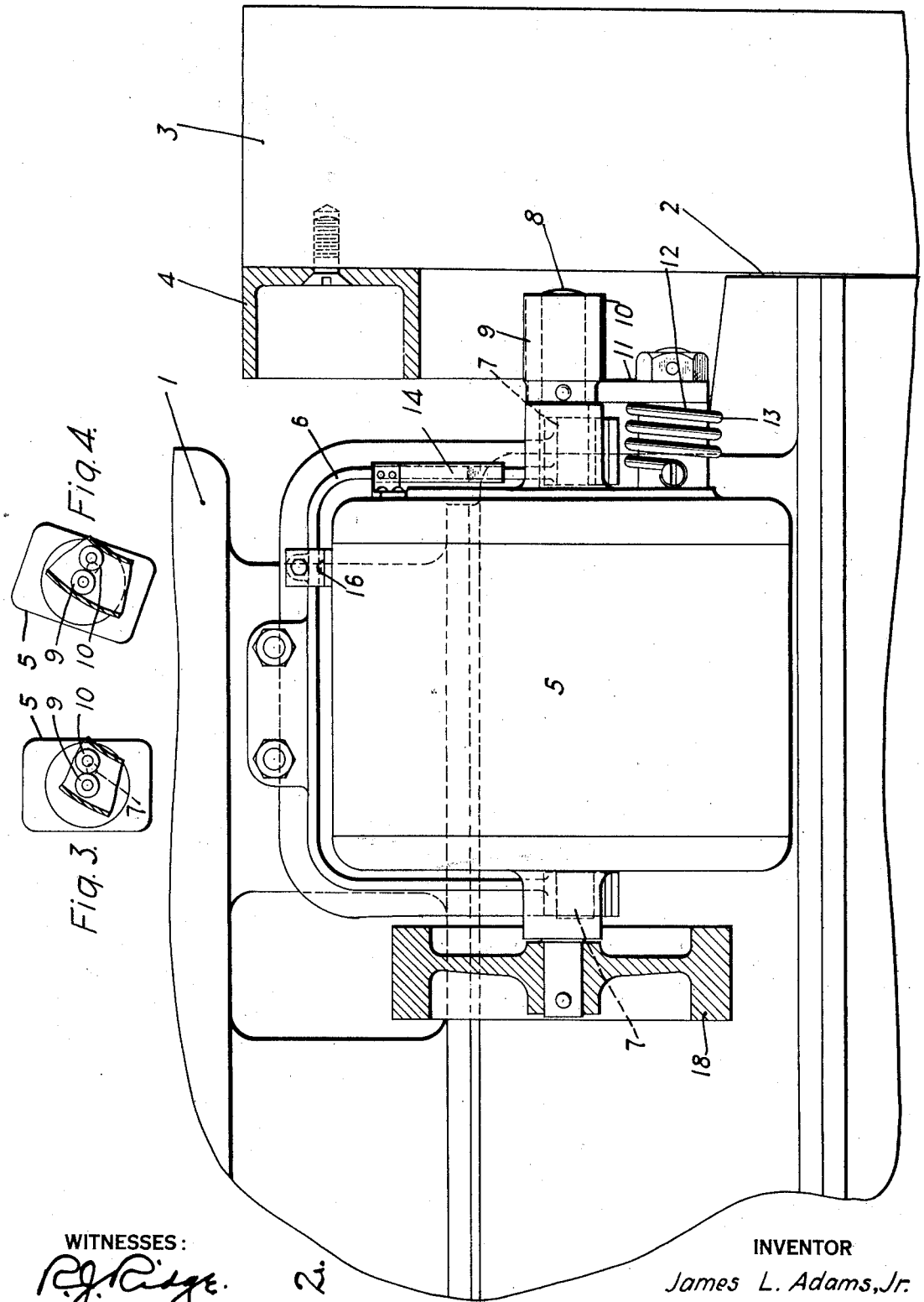

JAMES L. ADAMS, JR., OF WILKINSBURG, PENNSYLVANIA, ASSIGNOR TO WESTING-HOUSE ELECTRIC AND MANUFACTURING COMPANY, A CORPORATION OF PENNSYLVANIA.

STARTING MECHANISM FOR AUTOMOBILES.

1,248,776.  Specification of Letters Patent.  Patented Dec. 4, 1917.

Application filed May 4, 1915. Serial No. 25,702.

*To all whom it may concern:*

Be it known that I, JAMES L. ADAMS, Jr., a citizen of the United States, and a resident of Wilkinsburg, in the county of Allegheny and State of Pennsylvania, have invented a new and useful Improvement in Starting Mechanisms for Automobiles, of which the following is a specification.

My invention relates to starting mechanisms for automobiles, and it has particular reference to such mechanisms as embody friction wheels for operatively connecting starting motors to the shafts of internal combustion engines.

The object of my invention is to provide a simple and efficient means whereby a starting motor may be automatically connected to, and disconnected from, the shaft of an internal combustion engine.

It has been proposed heretofore to provide friction wheels for operatively connecting starting motors to the engine shafts of automobiles or other motor vehicles in order to avoid the many difficulties incident to the meshing of pinions and gear wheels where such mechanisms are employed. Such devices usually possess the disadvantage that the bearings must be constructed to withstand very great lateral pressures. This condition requires that an expensive construction must be employed in order to prevent breakage of the parts when the mechanism is in operation. The lateral stresses above noted cause very large bearing friction losses.

It has also been necessary to employ some form of releasing clutch in connection with mechanisms embodying gear wheels. The roller type of clutch, which is the form usually employed, sometimes fails to release the mechanism upon the starting of the engine, and the motor may be damaged by the excessive speed at which it is driven by the engine.

According to the present invention, I provide a starting motor that is adapted, when power is supplied to it, to automatically establish a driving connection to the engine fly wheel. This operative connection will be maintained as long as the motor constitutes the driving member, and the pressure of the engaging part will vary in accordance with the load upon the motor. The operative connection will be broken automatically upon the starting of the engine under its own power.

In the accompanying drawings, Figure 1 is an end view, partially in section and partially in elevation, of a portion of an internal combustion engine with my invention applied thereto. Fig. 2 is a side view, partially in elevation and partially in section, of the mechanism of Fig. 1. Figs. 3 and 4 are diagrammatic views showing the friction wheels in inoperative and operative positions, respectively. Fig. 5 is a view, partially in plan and partially in section, of a modification.

An internal combustion engine 1, only a portion of which is shown, comprises a shaft 2 upon which is mounted the usual fly wheel 3. The outer end of the fly wheel is provided with an annular flange 4 of substantially channel-shape in cross section that may be secured to the fly wheel in any suitable manner. An electric motor 5 is pivotally supported by a bracket 6 that may be secured to the engine crank case by any suitable means. The bracket 6 should, in practice, be elastically mounted in order to permit the slight movements made necessary by reason of irregularities in the operation of the fly wheel. The frame of the motor 5 is provided with lugs 7 which have a bearing in the arms of the bracket 6. The axes of the lugs 7 are not in alinement with the axis of the motor shaft 8.

The motor shaft 8, which projects into the groove formed by the flanges of the annular member 4, is provided with a friction wheel 9 that is adapted to coact with the outer flange. A second friction wheel 10 is pivotally connected, by means of a link 11, to a lug 12 that is integral with the motor frame. The friction wheels 9 and 10 are preferably surfaced with materials having high coefficients of friction relatively to each other and to the flanges with which they coact. A spring 13 normally maintains the friction wheel 10 in engagement with the friction wheel 9 and out of engagement with the inner flange of the annular member 4 with which is coacts.

A spring 14, which is secured to the motor 5 and bears against the bracket 6, normally maintains the motor in its illustrated position relatively to the bracket 6 and with the friction wheels 9 and 10 out of engagement with the corresponding flanges of the annular member 4. The movement of the motor 5 about its pivotal axis, by the force of the spring 14, is limited by a stop member 15 that is secured to the motor frame and engages the bracket 6 when the motor is in its illustrated or inoperative position. An adjustable stop member 16 serves to limit the movement of the motor about its pivotal axis in the opposite direction. A counterweight 17 may be employed to insure a more nearly equal distribution of the weight supported by the lugs 7.

In the inoperative position of the several parts, the friction wheels 9 and 10 occupy positions, relatively to the annular member 4, as illustrated in Fig. 3. To start the engine, the electrical connections of the motor are completed by any suitable means (not shown) and the armature shaft 8 rotates in a counter-clockwise direction, as viewed in Fig. 1. The reaction upon the frame of the motor incident to the acceleration of the motor armature and its connected parts rotates the frame in a clockwise direction about its points of pivotal support. The armature should be relatively heavy in order that its inertia may cause the reaction upon the motor frame to be as strong as possible. In certain cases, it may be advisable to supplement the inertia of the armature, as for example, by means of a small fly wheel 18.

Since the axes of the points of support of the motor are not coincident with the axis of the motor shaft and are between the axes of the friction wheels 9 and 10, the movement of the motor frame actuates the friction wheel 9 in a clockwise direction about the lugs 7 to cause it to engage the adjacent flange of the annular member 4. At the same time, the friction wheel 10 is actuated about the lugs 7 to engage the inner flange of the annular member 4. The friction wheels 9 and 10 have such dimensions that the sum of their diameters is slightly greater than the distance between the flanges of the annular member 4.

The result is to cause the friction wheels to be actuated into contact with the corresponding flanges at such an angle that the torque exerted by the friction wheel 9 tends to revolve it still further around the axis of support in the initial direction until the friction wheels are firmly wedged between the flanges so that no material relative movement can occur between their peripheries. The several coacting parts then occupy the respective positions illustrated in Fig. 4. The extent of the wedging action above described may be regulated by so adjusting the stop member 17 as to vary the angle between the line of centers of the friction wheels 9 and 10 and the tangents to the flanges at the points of engagement when the wheels are in operative positions.

The motor then operates to rotate the fly wheel 3 through the mechanism above described. The engagement of the friction wheels 9 and 10 with the corresponding flanges on the fly wheel is maintained by the torque of the friction wheel 9 tending to revolve it in a clockwise direction about the axes of the motor supports. This reaction is also supplemented by the reaction upon the motor frame. It will be noted that the torque of the friction wheel 10 tends to move it out of engagement with its corresponding flange but the radius of its movement is much shorter than that of the driving wheel 9. This force is, therefore, much smaller than the total forces exerted by the friction wheel 9 and the motor frame. The pressure upon the coacting parts exerted by the reaction of the motor frame is proportional to the load upon the motor, since the torque varies directly with the load.

It will be noted that, when the friction wheels are in their respective operative positions, the lateral pressures exerted upon them are very nearly balanced, thereby relieving their respective bearings from substantial lateral pressures such as are necessary in the devices of the prior art to produce the necessary frictional engagement. In the arrangement above described, the lateral pressures are due almost entirely to the torque necessary to rotate the engine shaft. The relative dimensions of the friction wheels are such that there will be very little relative movement of the engaging surfaces because of the difference in peripheral speeds of the outer and inner flanges. It will also be observed that, by making the friction wheels of small diameters and with comparatively long faces, no additional expensive reduction gearing is required.

When the engine starts under its own power, the fly wheel 3 will be rotated at a speed in excess of that imparted to it from the motor. The flanges rotate, therefore, at a speed which exceeds that of the corresponding friction wheels 9 and 10 so that the friction wheels and the field-magnet frame of the motor 5 are actuated about the axes of the motor supports to their respective inoperative positions. The return of the several parts to their respective inoperative positions is insured by the action of the spring 14, which is placed under tension when the driving connections are established. Since the motor now operates at its normal speed and with no load, the reaction upon the field magnet frame will be very small and, as the force of the spring 14 is practically unopposed, the motor remains disengaged from the fly wheel, even if the starting switch is not immediately opened.

A modification of my invention is illustrated in Fig. 5, in which similar numerals are employed to designate corresponding parts. The face of the fly wheel 3 is provided with a flanged member 19 of ring-shape. The member 19 is similar to the member 4 of Figs. 1 and 2 except that its flanges project substantially radially outwardly and they are inclined to each other. A motor 20, the axis of which is at an angle to the plane of the fly wheel 3, is pivotally supported by a stationary member 21 which may be adjustably secured to its means of support. A shaft 22, that is rotatably mounted in the member 21, is connected, by means of arms 23, to lugs 24 that are integral with the motor frame. The axes of the lugs 24 are at an angle to the axis of the motor shaft. A spring 25 serves to resiliently connect the stationary member to the motor in order to provide for longitudinal movements of the fly wheel 3.

The armature shaft of the motor is provided with a friction wheel 26 having substantially the shape of the frustum of a cone that coacts with one of the flanges of the annular member 19. A second friction wheel 27, of similar shape, is rotatably supported by a link 11. The friction wheels 26 and 27 correspond in function and in operation to the wheels 9 and 10, respectively, of Figs. 1 and 2. The operation of the mechanism of Fig. 5 is similar in all material respects to that described in connection with the device shown in Figs. 1 and 2.

An important advantage of the modified form of my invention consists in that the flanges of the member 19 have the same peripheral speeds and there is a tendency for relative movements between the several engaging friction surfaces. The supporting member 21 may be adjusted to compensate for wear of the coacting parts and thus maintain the necessary pressures between the several parts.

Many changes may occur to those skilled in the art to which my invention appertains. It is understood that such modifications may be made as fall within the scope of the appended claims without departing from the spirit of my invention.

I claim as my invention:

1. In a starting mechanism, the combination with a rotatable member having an annular groove, of a motor, and means for automatically engaging the sides of said groove to rotate said member upon the actuation of said motor.

2. In a starting mechanism, the combination with a driven shaft, and a rotatable member operatively connected thereto, of a motor and means for automatically operatively connecting said motor to said member upon the actuation of the motor, said means comprising a pair of mutually engaging coacting friction wheels mounted to revolve about a pivotal support.

3. In a starting mechanism, the combination with an engine shaft, and a rotatable member operatively connected thereto, of automatic means for rotating said member, said means comprising a pivotally mounted motor and a pair of coacting friction wheels operatively connected to said motor and bodily movable therewith.

4. In a starting mechanism, the combination with an engine shaft, and a rotatable member operatively connected thereto and having a pair of concentric circular portions, of a pair of coacting friction wheels for engaging said circular portions, and a pivotally mounted motor for controlling the engagement of said wheels with said member.

5. In a starting mechanism, the combination with a rotatable member having a pair of concentric friction surfaces, of a pair of friction wheels between said surfaces, and a pivotally mounted motor for automatically actuating said friction wheels into engagement with said surfaces when the motor is the driving member.

6. In a starting mechanism, the combination with an engine shaft, a rotatable member operatively connected thereto and having concentric friction surfaces, of a motor having a pivotal support eccentric to its axis, a plurality of friction wheels bodily movable with said motor for engaging said surfaces, and means for normally retaining said wheels in their disengaged positions.

7. In a starting mechanism, the combination with a rotatable member having a pair of concentric friction surfaces, of a pair of friction wheels between said surfaces, and means for automatically shifting said wheels into and out of engagement with said surfaces according as the wheels constitute the driving or the driven members.

8. In a starting mechanism, the combination with a rotatable member having a pair of concentric friction surfaces, of a pair of friction wheels between said surfaces, the diameters of said wheels being together greater than the distance between said surfaces, and means for automatically controlling the position of said wheels and for actuating them.

9. In a frictional speed-reduction mechanism, the combination with a rotatable member having an annular groove, of means for actuating two friction wheels into engagement with opposite sides of said groove, and means for rotating said friction wheels.

In testimony whereof, I have hereunto subscribed my name this 27th day of April, 1915.

JAMES L. ADAMS, Jr.